(12) United States Patent
Fukuta (10) Patent No.: US 10,805,985 B2
(45) Date of Patent: Oct. 13, 2020

(54) RADIO TERMINAL AND BASE STATION

(71) Applicant: KYOCERA CORPORATION, Kyoto (JP)

(72) Inventor: Noriyoshi Fukuta, Inagi (JP)

(73) Assignee: KYOCERA Corporation, Kyoto (JP)

( * ) Notice: Subject to any disclaimer, the term of this patent is extended or adjusted under 35 U.S.C. 154(b) by 44 days.

(21) Appl. No.: 16/184,758

(22) Filed: Nov. 8, 2018

(65) Prior Publication Data

US 2019/0098698 A1 Mar. 28, 2019

Related U.S. Application Data

(63) Continuation of application No. PCT/JP2017/017687, filed on May 10, 2017.

(30) Foreign Application Priority Data

May 13, 2016 (JP) ................................ 2016-097471

(51) Int. Cl.
*H04W 88/06* (2009.01)
*H04W 76/20* (2018.01)
(Continued)

(52) U.S. Cl.
CPC ....... *H04W 88/06* (2013.01); *H04W 36/0009* (2018.08); *H04W 36/03* (2018.08);
(Continued)

(58) Field of Classification Search
CPC ..... H04W 36/03; H04W 36/08; H04W 92/18; H04W 76/23; H04W 88/04; H04W 36/0009; H04W 76/15; H04W 88/06; H04W 36/38; H04W 76/20; H04W 8/005; H04W 76/14; H04W 8/26; H04W 40/22; Y02D 70/12; Y02D 70/00; Y02D 70/126; Y02D 70/10
See application file for complete search history.

(56) References Cited

U.S. PATENT DOCUMENTS 5,590,132 A * 12/1996 Ishibashi ............. H04L 12/2852
370/236
6,614,755 B1 * 9/2003 Dote ....................... H04L 47/10
370/230
(Continued)

OTHER PUBLICATIONS

ZTE, "Discussion on the V2V path selection between Uu and PC5", 3GPP TSG-RAN WG2 Meeting #bis, R2-162401 Dubrovnik, Croatia, Apr. 11-15, 2016.
(Continued)

*Primary Examiner* — Bunjob Jaroenchonwanit
(74) *Attorney, Agent, or Firm* — Studebaker & Brackett PC (57) ABSTRACT

A radio terminal according to one embodiment comprises: a controller configured to establish a direct first connection between the radio terminal and a base station; and a receiver configured to receive a first message from the base station. The first message is a message for restricting the radio terminal from transmitting uplink information to the base station via the first connection. The receiver receives the first message transmitted from the base station when a second connection for relay is established between a relay terminal connected to the base station and the radio terminal.

6 Claims, 8 Drawing Sheets

(51) Int. Cl.
  *H04W 36/00*  (2009.01)
  *H04W 88/04*  (2009.01)
  *H04W 76/15*  (2018.01)
  *H04W 76/23*  (2018.01)
  *H04W 36/08*  (2009.01)
  *H04W 36/38*  (2009.01)
  *H04W 8/26*   (2009.01)
  *H04W 8/00*   (2009.01)
  *H04W 40/22*  (2009.01)

(52) U.S. Cl.
  CPC ........... *H04W 36/08* (2013.01); *H04W 36/38* (2013.01); *H04W 76/15* (2018.02); *H04W 76/20* (2018.02); *H04W 76/23* (2018.02); *H04W 88/04* (2013.01); *H04W 8/005* (2013.01); *H04W 8/26* (2013.01); *H04W 40/22* (2013.01); *Y02D 30/70* (2020.08)

(56) References Cited

U.S. PATENT DOCUMENTS

| | | | | |
|---|---|---|---|---|
| 9,072,027 | B2* | 6/2015 | Vasudevan | H04W 40/02 |
| 2007/0275723 | A1* | 11/2007 | Jeong | H04B 7/2681 |
| | | | | 455/436 |
| 2015/0029920 | A1* | 1/2015 | Hoehne | H04L 1/1812 |
| | | | | 370/311 |
| 2015/0245400 | A1* | 8/2015 | Aoki | H04W 76/12 |
| | | | | 370/329 |
| 2015/0358133 | A1* | 12/2015 | Kusashima | H04L 5/0048 |
| | | | | 370/280 |
| 2016/0081137 | A1* | 3/2016 | Pang | H04W 72/042 |
| | | | | 370/329 |
| 2017/0111780 | A1* | 4/2017 | Rico Alvarino | H04W 74/0833 |
| 2019/0075517 | A1* | 3/2019 | Martin | H04W 52/0212 |
| 2019/0208526 | A1* | 7/2019 | Liu | H04W 72/082 |
| 2019/0223103 | A1* | 7/2019 | Song | G06F 1/3206 |
| 2019/0261069 | A1* | 8/2019 | Balakrishnan | G07C 5/0858 |
| 2020/0052774 | A1* | 2/2020 | Basu Mallick | H04B 7/15557 |

OTHER PUBLICATIONS

3rd Generation Partnership Project; "Technical Specification Group Radio Access Network; Evolved Universal Terrestrial Radio Access (E-UTRA) and Evolved Universal Terrestrial Radio Access Network (E-UTRAN)"; 3GPP TS 36.300 V13.3.0; Mar. 2016; pp. 1-295; Release 13; 3GPP Organizational Partners.

* cited by examiner

RADIO TERMINAL AND BASE STATION

CROSS-REFERENCE TO RELATED APPLICATION

The present application is a continuation based on PCT Application No. PCT/JP2017/017687 filed on May 10, 2017, which claims the benefit of Japanese Patent Application No. 2016-097471 (filed on May 13, 2016). The content of which is incorporated by reference herein in their entirety.

FIELD

The present disclosure relates to a radio terminal and a base station used in a communication system.

BACKGROUND

In 3GPP (3rd Generation Partnership Project), which is a project aiming to standardize a mobile communication system, the specifications of proximity-based services (ProSes) have been designed (see Non Patent Document 1).

In the ProSe, a specific radio terminal (ProSe UE-to-Network relay) can relay traffic between another radio terminal (remote UE) and a network.

PRIOR ART DOCUMENT

Non-Patent Document

Non Patent Document 1: 3GPP Technical Specification "TS 36.300 V13.3.0" Apr. 1, 2016

SUMMARY

A radio terminal according to one embodiment comprises: a controller configured to establish a direct first connection between the radio terminal and a base station; and a receiver configured to receive a first message from the base station. The first message is a message for restricting the radio terminal from transmitting uplink information to the base station via the first connection. The receiver receives the first message transmitted from the base station when a second connection for relay is established between a relay terminal connected to the base station and the radio terminal.

A base station according to one embodiment comprises: a controller configured to establish a direct first connection between a radio terminal and the base station; and a transmitter configured to transmit a first message to the radio terminal. The first message is a message for restricting the radio terminal from transmitting uplink information to the base station via the first connection. The transmitter transmits the first message to the radio terminal when a second connection for relay is established between a relay terminal connected to the base station and the radio terminal.

DESCRIPTION OF THE EMBODIMENT

Overview of Embodiments

A radio terminal according to one embodiment may comprise: a controller configured to establish a direct first connection between the radio terminal and a base station; and a receiver configured to receive a first message from the base station. The first message may be a message for restricting the radio terminal from transmitting uplink information to the base station via the first connection. The receiver may receive the first message transmitted from the base station when a second connection for relay is established between a relay terminal connected to the base station and the radio terminal.

The controller may omit a process of transmitting a measurement report on a radio environment of the radio terminal to the base station in response to receiving the first message.

The receiver may receive a second message for executing a handover from the base station to another base station. The controller may execute the handover according to the second message. The controller may omit a process for establishing uplink synchronization with the other base station when executing the handover.

The first message may include a first identifier that is commonly assigned to all radio terminals that are relayed by the relay terminal and have received the first message.

The second message may be a message for all the radio terminals to execute a handover from the base station to the other base station.

The second message may not include an identifier individually assigned by the other base station. The controller may execute a contention-based random access procedure when there is information to be communicated via a direct connection with the other base station.

The second message may include a second identifier commonly assigned to all the radio terminals instead of an identifier individually assigned by the other base station. The controller may notify the base station of the second identifier in the random access procedure.

A base station according to one embodiment may comprise: a controller configured to establish a direct first connection between a radio terminal and the base station; and a transmitter configured to transmit a first message to the radio terminal. The first message may be a message for restricting the radio terminal from transmitting uplink information to the base station via the first connection. The transmitter may transmit the first message to the radio terminal when a second connection for relay is established between a relay terminal connected to the base station and the radio terminal.

The transmitter may transmit, to the radio terminal, a second message for executing a handover from the base station to another base station. The transmitter may transmit the second message to the radio terminal based on a measurement report on a radio environment of the relay terminal.

The first message may include a first identifier that is commonly assigned to all radio terminals that are relayed by the relay terminal and have received the first message. The second message may a message for all the radio terminals to execute a handover from the base station to the other base station.

First Embodiment (Mobile Communication System)

Figure 1:
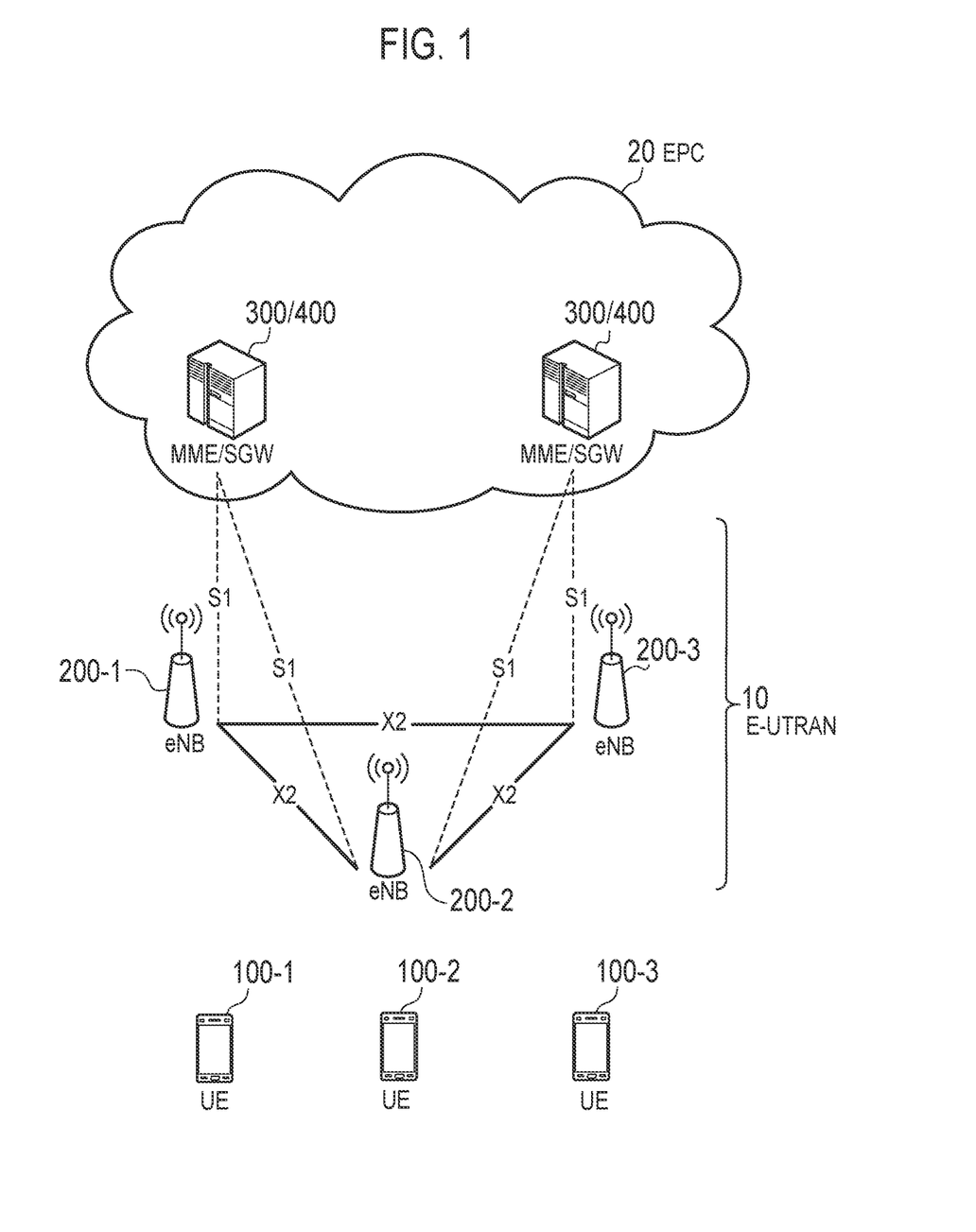
FIG. 1 is a diagram illustrating a configuration of an LTE system.

The configuration of the mobile communication system according to the embodiment will be described. FIG. 1 is a diagram illustrating a configuration of a Long Term Evolution (LTE) system.

As illustrated in FIG. 1, the LTE system includes a User Equipment (UE) 100, an Evolved-Universal Terrestrial Radio Access Network (E-UTRAN) 10, and an Evolved Packet Core (EPC) 20.

The UE 100 corresponds to a communication apparatus (radio terminal). The UE 100 is a mobile communication apparatus. The UE 100 performs radio communication with a cell (later described eNB 200). The configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The configuration of the eNB 200 will be described later.

The eNB 200 manages one or a plurality of cells. The eNB 200 performs radio communication with the UE 100 that has established connection with cells managed by the eNB 200. The eNB 200 has a radio resource management (RRM) function, a routing function of user data (hereinafter, simply referred to as "data"), a measurement control function for mobility control and scheduling, and the like. The "cell" is used as a term indicating the minimum unit of a radio communication area. The "cell" is also used as a term indicating a function of performing radio communication with the UE 100.

The EPC 20 corresponds to a core network. The EPC 20 may constitute a network together with the E-UTRAN 10. The EPC 20 includes an MME (Mobility Management Entity) 300 and an SGW (Serving Gateway) 400

The MME 300 performs, for example, various kinds of mobility control for the UE 100. The SGW 400 performs, for example, data transfer control. The MME 300 and the SGW 400 are connected to the eNB 200 via a S1 interface.

Figure 2:
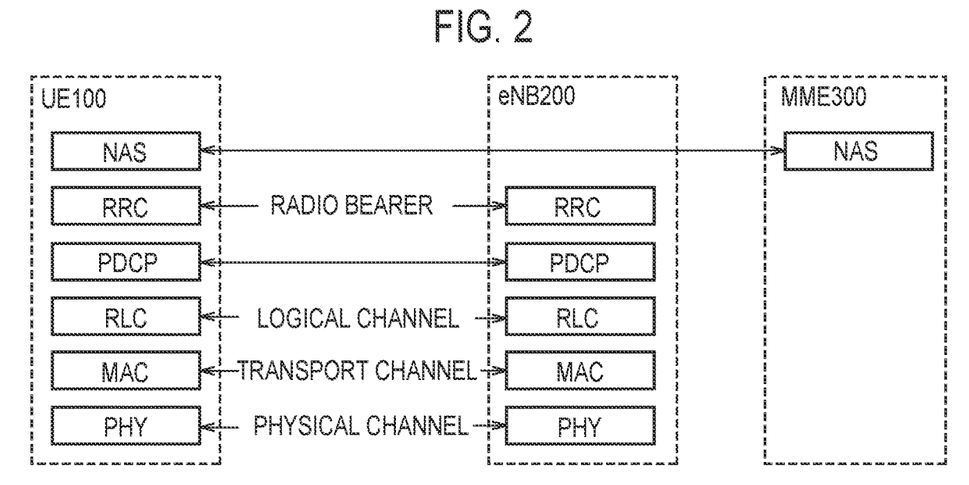
FIG. 2 is a protocol stack diagram of a radio interface in the LTE system.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control signal are transferred via a transport channel. The MAC layer of the eNB 200 includes a scheduler (MAC scheduler). The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control signal. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected state. If there is not a connection (RRC connection) between the RRC of the UE 100 and the RRC of the eNB 200, the UE 100 is in an RRC idle state.

A non-access stratum (NAS) layer located above the RRC layer performs, for example, session management, mobility management, and the like.

Figure 3:
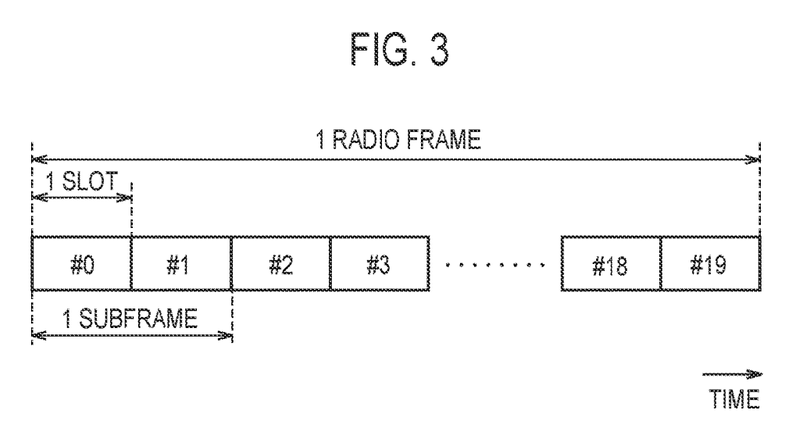
FIG. 3 is a configuration diagram of a radio frame used in the LTE system.

FIG. 3 is a configuration diagram of a radio frame used in the LTE system. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. Radio resources (time/frequency resources) are allocated to the UE 100. In the frequency direction, radio resources (frequency resources) are constituted by resource blocks. In the time direction, radio resources (time resources) are constituted by subframes (or slots).

In the downlink, the section of the first several symbols of each subframe is an area that can be used as a physical downlink control channel (PDCCH) for transmitting a downlink control signal. The remaining part of each subframe is an area that can be used as a physical downlink shared channel (PDSCH) for transmitting downlink data.

In the uplink, both end portions in the frequency direction in each subframe are areas usable as a Physical Uplink Control Channel (PUCCH) for transmitting an uplink control signal. The remaining part of each subframe is an area that can be used as a physical uplink shared channel (PUSCH) for transmitting uplink data.

(Proximity-Based Service)

Proximity-based services (ProSes) will be described. The proximity-based service is a service that can be provided by a 3GPP system, based on communication devices (for example, UEs 100) in the vicinity of each other.

In the ProSe, various types of radio signals are transmitted and received via a direct radio link between nodes (for example, between UEs), without passing through the eNB 200. The direct radio link in ProSe is called "sidelink".

The sidelink may be an interface for sidelink communication and sidelink discovery (for example, an interface between a UE and a UE). The sidelink communication is a function (AS functionality) for enabling ProSe direct communication (hereinafter, appropriately referred to as "direct communication"). The sidelink discovery is a function (AS functionality) for enabling ProSe direct discovery (hereinafter, appropriately referred to as "direct discovery").

The sidelink corresponds to a PC5 interface. The PC5 is a reference point between ProSe usable UEs (ProSe-enabled UE) used for a control plane and a user plane for the ProSe direct discovery, the ProSe direct communication, and a ProSe UE-Network relay.

For modes of the ProSe, "direct discovery (Direct Discovery)", "direct communication (Direct Communication)", and "Relay" are defined. "Relay" will be described later.

The direct discovery is a mode of searching for a partner destination by directly transmitting, between the UEs, a discovery message (discovery signal) that does not specify a specific destination. The direct discovery is a procedure for discovering another UE in the vicinity of the UE by using a direct radio signal in E-UTRA (Evolved Universal Terrestrial Radio Access) via the PC5. Alternatively, the direct discovery is a procedure adopted by a UE 100 capable of executing the proximity-based service for discovering another UE 100 capable of executing the proximity-based service by using only a capability of the two UEs 100 with the help of the E-UTRA technology. The direct discovery is supported only if the service is provided to the UE 100 by the E-UTRAN (eNB 200 (cell)). The service can be provided by the E-UTRAN if the UE 100 is either connected to the cell (eNB 200) or located in the cell.

A resource allocation type for the transmission (announcement) of the discovery message (discovery signal) includes "Type 1" and "Type 2 (Type 2B)". In "Type 1", the UE 100 selects a radio resource. In "Type 2 (Type 2B)", the eNB 200 allocates a radio resource. In Type 1, the UE 100 may select a radio resource from resource pools provided by the eNB 200.

A "Sidelink Direct Discovery" protocol stack includes a physical (PHY) layer, a MAC layer, and the ProSe protocol. Between the physical layer of a UE (A) and the physical layer of a UE (B), a discovery signal is transmitted via a physical channel called a physical sidelink discovery channel (PSDCH). Between the MAC layer of the UE (A) and the MAC layer of the UE (B), a discovery signal is transmitted via a transport channel called a sidelink discovery channel (SL-DCH).

The direct communication is a mode in which data is directly transmitted between the UEs by specifying a specific destination (destination group). The direct communication is communication between two or more UEs capable of executing the proximity-based services through user plane transmission in which the E-UTRA technology is used via a path without passing through any network node.

A resource allocation type of the direct communication includes "Mode 1" and "Mode 2". In "Mode 1", the eNB 200 specifies a radio resource of the direct communication. In "Mode 2", the UE 100 selects a radio resource of the direct communication. In Mode 2, the UE 100 may select a radio resource from the resource pools provided by the eNB 200.

A direct communication protocol stack includes a physical (PHY) layer, a MAC layer, an RLC layer, and a PDCP layer. Between the physical layer of the UE (A) and the physical layer of the UE (B), a control signal is transmitted via a physical sidelink control channel (PSCCH), and data is transmitted via a physical sidelink shared channel (PSSCH). A synchronization signal and the like may be transmitted via a physical sidelink broadcast channel (PSBCH). Between the MAC layer of the UE (A) and the MAC layer of the UE (B), data is transmitted via a transport channel called a sidelink shared channel (SL-SCH). Between the RLC layer of the UE (A) and the RLC layer of the UE (B), data is transmitted via a logical channel called a sidelink traffic channel (STCH).

(Relay Using Proximity-Based Service)

Figure 4:
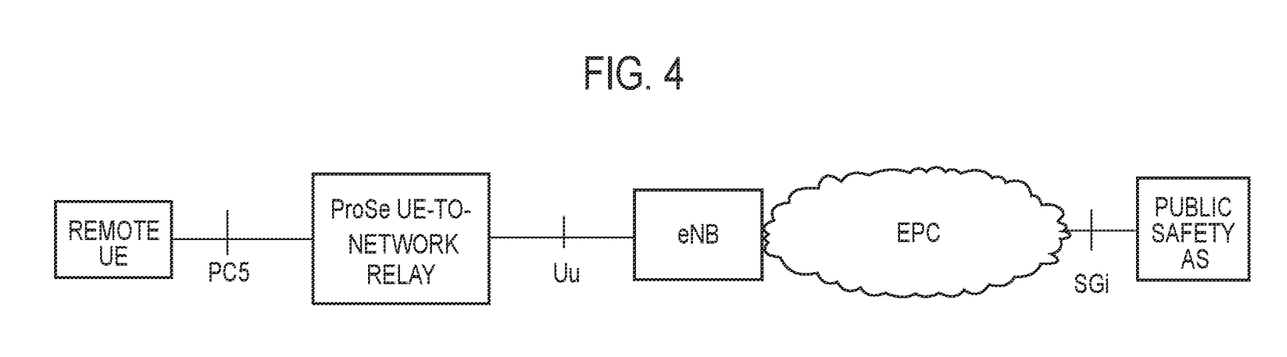
FIG. 4 is a diagram for describing a relay using a proximity-based service.

A relay using the proximity-based service (ProSe relay) will be described with reference to FIG. 4. FIG. 4 is a diagram for describing the relay using the proximity-based service according to the embodiment.

In FIG. 4, a remote UE (Remote UE) is a UE 100 that communicates with a PDN (Packet Data Network) via a relay UE (ProSe UE-to-Network Relay). The remote UE may be a UE for public safety (ProSe-enabled Public Safety UE).

The "ProSe-enabled Public Safety UE" is configured such that an HPLMN (Home Public Land Mobile Network) is authorised for use for public safety. The "ProSe-enabled Public Safety UE" can utilize the proximity-based services, and supports the procedures in the proximity-based services as well as a specific capability for public safety. For example, the "ProSe-enabled Public Safety UE" transmits information for public safety through the proximity-based services. The information for public safety includes, for example, information on a disaster (such as an earthquake and a fire) and information used by a fire official or a police official.

The remote UE may be a UE that is located outside the network area (Out-of-Network). That is, the remote UE may be located outside a coverage of the cell. The remote UE may be located within the coverage of the cell. Therefore, the remote UE may be a UE 100 to which a service is not directly provided by the E-UTRAN 10 (UE 100 which is not served by the E-UTRAN 10). The remote UE is provided with a ProSe relay service from the relay UE, as described later. A relay is executed between the remote UE that is provided with the ProSe relay service and the relay UE that provides the ProSe relay service.

The relay UE (ProSe UE-to Network Relay) provides functions to support connectivity of "Unicast" services for the remote UE. Therefore, the relay UE provides the ProSe relay service for the remote UE. Therefore, the relay UE can relay data (unicast traffic) between the remote UE and the network. The relay UE can relay data (traffic) of the remote UE through the proximity-based services (direct communication). Specifically, the relay UE can relay data (uplink traffic) received from the remote UE via the PC5 interface to the eNB 200 via a Uu interface (LTE-Uu) or a Un interface (LTE-Un). The relay UE can relay data (downlink traffic) received from the eNB 200 via the Uu interface or the Un interface to the remote UE via the PC5 interface. The relay UE may be located only within the network (within the coverage of the cell).

The relay UE can provide a comprehensive function capable of relaying any type of traffic related to the communication for public safety.

The relay UE and the remote UE can transmit data and control signals between the physical layers. Similarly, the relay UE and the remote UE can transmit data and control signals between the MAC layers, between the RLC layers, and between the PDCP layers. In addition, the relay UE may have an IP-Relay layer as an upper layer of the PDCP layer. The remote UE may also have an IP layer as an upper layer of the PDCP layer. The relay UE and the remote UE can transmit data and control signals between the IP-Relay layer and the IP layer. It is possible for the relay UE to transmit data between the IP-Relay layer and the IP layer of a POW. The PGW (Packet Data Network Gateway) performs control to relay user data from an external network (and to an external network).

In an AS layer (Access Stratum), the relay UE can transmit data (traffic) to the remote UE by broadcast. In the AS layer, the relay UE may transmit data to the remote UE by unicast. If the ProSec relay service is executed by broadcast, a feedback in the NAS layer (Non Access Stratum) may be performed between the relay UE and the remote UE, but a feedback in the AS layer is not performed. If the UE-Network relay is executed by unicast, the feedback in the AS layer may be performed.

Figure 5:
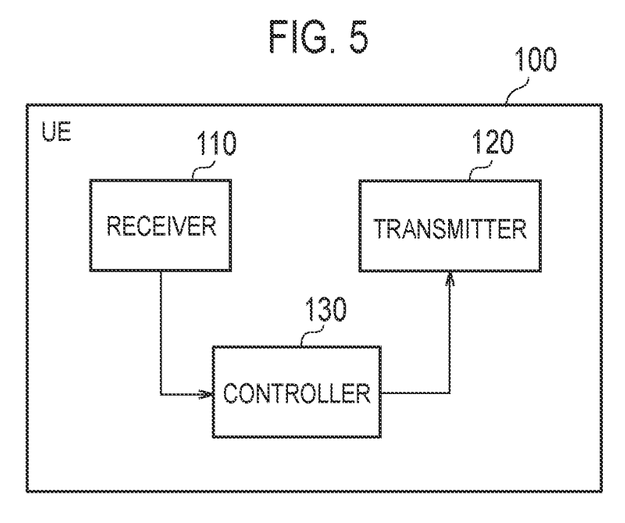
FIG. 5 is a block diagram of a UE 100.

(Radio terminal) The UE 100 (radio terminal) according to the embodiment will be described. FIG. 5 is a block diagram of the UE 100. As illustrated in FIG. 5, the UE 100 includes a receiver 110, a transmitter 120, and a controller 130. The receiver 110 and the transmitter 120 may be an integrated transceiver.

The receiver 110 performs various types of receptions under the control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmissions under the control of the controller 130. The transmitter 120 includes an antenna. The transmitter 120 converts the baseband signal (transmission signal) output from the controller 130 into a radio signal. The transmitter 130 transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit).

The baseband processor performs, for example, modulation and demodulation, and coding and decoding, of the baseband signal. The CPU executes a program stored in the memory to perform various types of processes. The processor may include a codec configured to perform encoding and decoding on sound and video signals. The processor executes various types of processes described later, and various types of communication protocols described above.

The UE 100 may include a GNSS (Global Navigation Satellite System) receiver unit. The GNSS receiver unit can receive a GNSS signal to obtain location information indicating a geographical location of the UE 100. The GNSS receiver unit outputs the GNSS signal to the controller 130. The UE 100 may have a GPS (Global Positioning System) function for acquiring location information of the UE 100.

For simplicity, a process executed by at least any one of the receiver 110, the transmitter 120, and the controller 130 included in the UE 100 is described herein as a process (operation) executed by the UE 100.

(Base Station)

Figure 6:
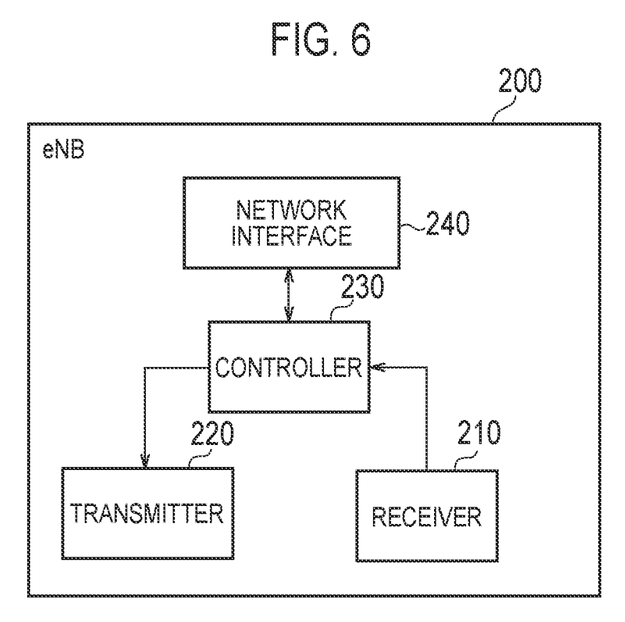
FIG. 6 is a block diagram of an eNB 200.

The eNB 200 (base station) according to the embodiment will be described. FIG. 6 is a block diagram of the eNB 200. As illustrated in FIG. 6, the eNB 200 includes a receiver 210, a transmitter 220, a controller 230, and a network interface 240. The receiver 210 and the transmitter 220 may be an integrated transceiver.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts the baseband signal (transmission signal) output from the controller 230 into a radio signal. The transmitter 220 transmits the radio signal by the antenna.

The controller 230 performs various types of controls in the eNB 200. The controller 230 includes a processor and a memory. The memory stores a program to be executed by the processor, and information to be used for a process by the processor. The processor includes a baseband processor and a CPU. The baseband processor performs, for example, modulation and demodulation, coding and decoding, and the like, of the baseband signal. The CPU executes a program stored in the memory to perform various types of processes. The processor executes various types of processes described later, and various types of communication protocols described above.

The network interface 240 is connected to a neighbour eNB 200 via the X2 interface. The network interface 240 is connected to the MME 300 and the SGW 400 via the S1 interface. The network interface 240 is used in communication performed on the X2 interface and communication performed on the S1 interface, for example.

For simplicity, a process executed by at least any one of the transmitter 210, the receiver 220, the controller 230, and the network interface 240 included in the eNB 200 is described herein as a process (operation) executed by the eNB 200.

Figure 7:
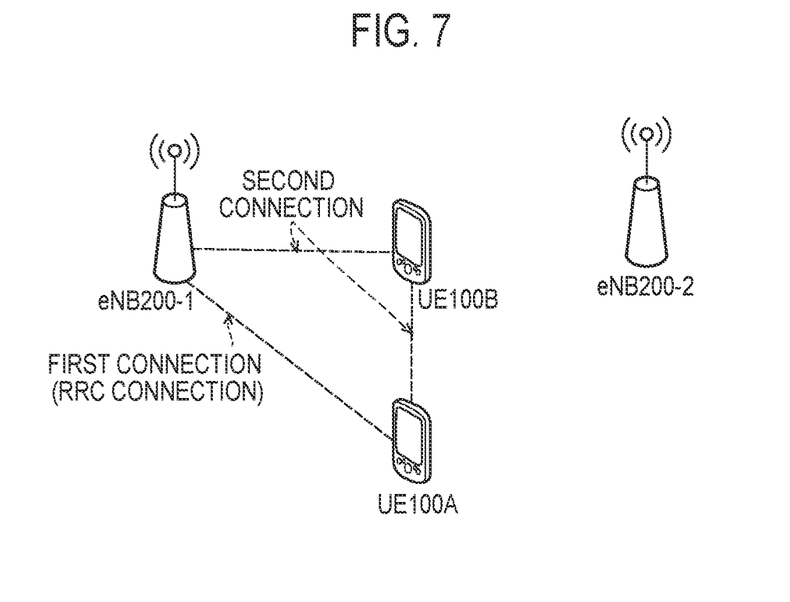
FIG. 7 is a diagram for describing an operation environment according to an embodiment.

(Operation according to embodiment) First, an operation environment according to the embodiment will be described with reference to FIG. 7. FIG. 7 is a diagram for describing an operation environment according to the embodiment.

As illustrated in FIG. 7, a UE 100A has established a connection (RRC connection) with an eNB 200-1 (first cell). Therefore, the UE 100A is in the RRC connected state. The eNB 200-1 manages the first cell.

A UE 100B is located near the UE 100A. The UE 100B may have established a connection (RRC connection) with the eNB 200-1 (first cell). Accordingly, the UE 100B may be in the RRC connected state. Alternatively, the UE 100B may not have established a connection with the eNB 200-1. Alternatively, the UE 100B may be in the RRC idle state.

In the present embodiment, the UE 100B is a relay UE (ProSe UE-to-Network Relay) capable of executing a relay (ProSe relay) using the proximity-based service. Alternatively, the UE 100B may be a UE that can be a relay UE.

An eNB 200-2 manages a second cell. The eNB 200-2 corresponds to a neighbour eNB of the eNB 200-1.

Operation patterns 1 to 3 according to the present embodiment will be described below.

Specifically, in Operation pattern 1, the case where the UE 100A starts a UL dormant mode described later will be described. In Operation pattern 2, the case where the UE 100A in the UL dormant mode executes a handover will be described. In Operation pattern 3, the case where the UE 100A that has executed the handover executes a connection with the eNB 200-2 will be described.

(A) Operation Pattern 1

Figure 8:
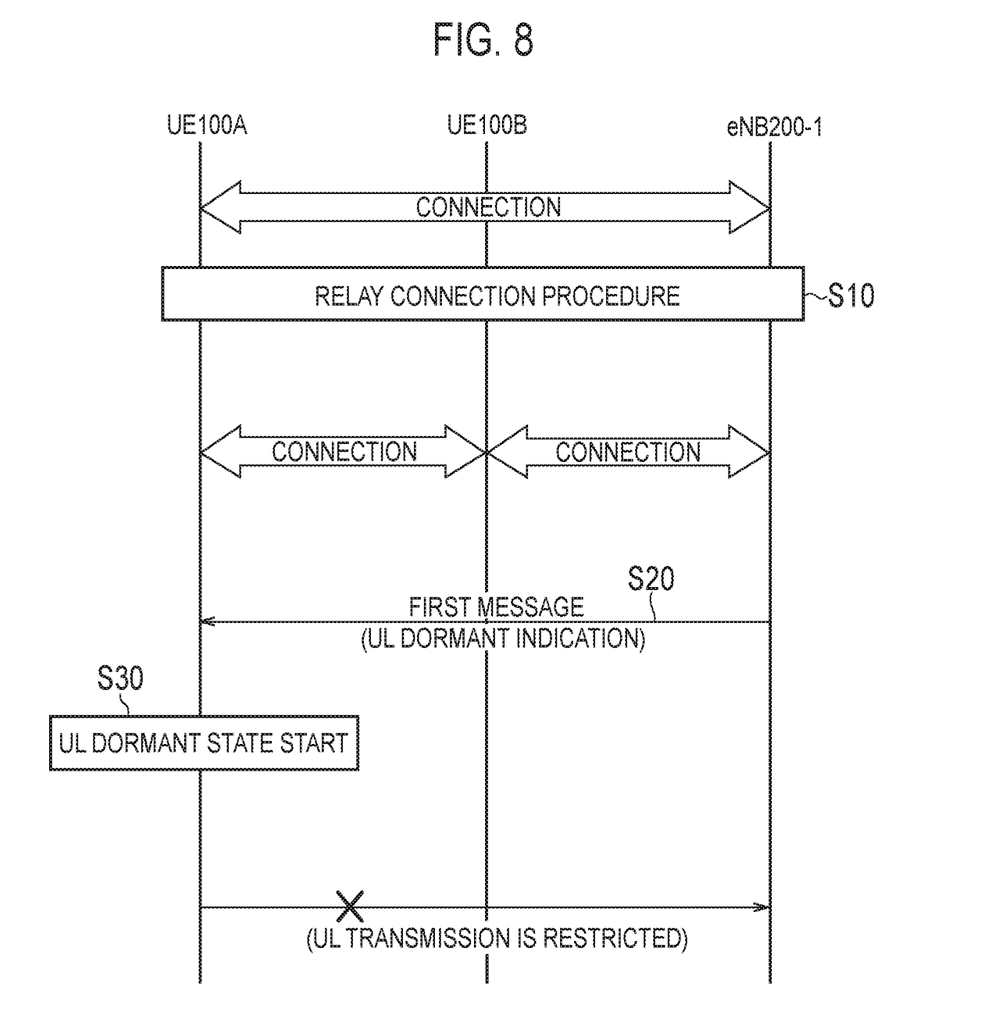
FIG. 8 is a sequence chart for describing Operation pattern 1.

Operation pattern 1 will be described with reference to FIG. 8. FIG. 8 is a sequence chart for describing Operation pattern 1.

In an initial state of FIG. 8, the UE 100A has established a connection (RRC connection) with the eNB 200-1. The connection is a direct connection (first connection) between the UE 100A and the eNB 200-1.

In step S10, the UE 100A executes an operation for establishing a connection for a relay (ProSe relay) using the proximity-based service. Specifically, the UE 100A establishes a connection for one-to-one communication with the UE 100B.

The UE 100A may execute a discovery procedure for discovering the relay UE (UE 100B) before establishing the connection. The UE 100A may discover the UE 100B by receiving a discovery signal from the UE 100B (so-called Model A). The UE 100A may transmit a discovery signal for discovering the relay UE. The UE 100B can transmit a response signal (discovery signal) to the discovery signal from the UE 100A. The UE 100A may discover the UE 100B by receiving the discovery signal from the UE 100B (so-called Model B).

The UE 100B may establish a connection for a relay of the UE 100A with the eNB 200-1.

Thus, a connection (second connection) is established between the UE 100A and the eNB 200-1 via the UE 100B. The first connection is in an established state.

In step S20, the eNB 200-1 transmits a message (first message) to the UE 100A.

The first message is a message for restricting transmission of uplink information to the eNB 200-1 via a direct connection (first connection) between the UE 100A and the eNB 200-1. The uplink information includes control information and user data from the UE 100A to the eNB 200-1.

The eNB 200-1 transmits the first message to the UE 100A when the second connection is established. The UE 100A receives, from the eNB 200-1, the first message transmitted when the second connection is established. The UE 100A may apply settings included in the first message when the second connection is established.

For example, the eNB 200-1 may transmit the first message to the remote UE (UE 100A) that is in the RRC connected state in response to establishing the connection for relay.

When not receiving the uplink information via the first connection for a predetermined period of time, the eNB 200-1 may transmit the first message to the UE 100A. The eNB 200-1 may include a timer for measuring the predetermined period of time. When receiving the uplink information via the first connection, the eNB 200-1 may reset and start (restart) the timer. The eNB 200-1 may transmit the first message to the UE 100A when the timer expires.

The eNB 200-1 may transmit the first message if the UE 100A is a source of uplink interference. The eNB 200-1 may transmit the first message in response to a request from the UE 100A (or the UE 100B).

The eNB 200-1 may transmit the first message via the first connection. The eNB 200-1 may transmit the first message via the second connection via the UE 100B.

The first message includes, for example, UL dormant information (UL dormant indication). The UL dormant information is control information for applying the UL dormant mode to the UE 100A.

The first message may include an identifier (group identifier: G-RNTI (Group-Radio Network Temporary Identifier)) assigned to a UE that is in the UL dormant mode. The G-RNTI is an identifier that is commonly assigned among all the UEs 100 that are relayed by the same UE 100B and have received the first message. The eNB 200-1 can assign the G-RNTI to the UE 100A relayed by the same UE 100B.

The first message may include an identifier of the UE 100B (identifier of the relay UE (ProSe Relay UE ID)). For example, when the eNB 200-1 transmits the first message by broadcast, the identifier of the UE 100B can be included in the first message. When receiving the first message including the identifier of the UE 100B that is the relay UE of the UE 100A, the UE 100A may determine that the destination of the first message is the UE 100A.

When other UEs 100 to be relayed by the UE 100B have not received the first message, the other UEs 100 may not be assigned the G-RNTI.

The eNB 200-1 stores a correspondence between the UE 100A in the UL dormant mode and the relay UE (UE 100B). When assigning the G-RNTI, the eNB 200-1 stores a correspondence between the relay UE and the G-RNTI.

In step S30, in response to receiving the first message (UL dormant information), the UE 100A starts the UL dormant mode (the UL dormant mode is applied). That is, the UE 100A shifts to a UL dormant mode state.

The UE 100A in the UL dormant mode is restricted from transmitting the uplink information to the eNB 200-1 via the first connection. Specifically, the UE 100A cannot transmit the uplink information to the eNB 200-1 via the first connection. The UE 100A may transmit the uplink information to the eNB 200-1 via the second connection.

In response to receiving the first message, the UE 100A can omit a process of transmitting a measurement report on a radio environment of the UE 100A to the eNB 200-1. The UE 100A may omit measurement of the reception level of a radio signal from a cell (a serving cell and/or a neighbour cell). The reception level is, for example, a reception power (RSRP: Reference Signal Received Power), a reception quality (RSRQ: Reference Signal Received Quality), or the like.

On the other hand, since the first connection is not released and is thus in the established state, the UE 100A can receive downlink information from the eNB 200-1 via the first connection. The downlink information includes control information and user data from the eNB 200-1 to the UE 100A.

The UE 100A may receive the control information from the eNB 200-1 via the first connection, and receive the user data from the eNB 200-1 via the second connection. The eNB 200-1 can transmit the common control information to the remote UE that is under the control of the UE 100B together with the G-RNTI.

When the UE 100A is in the UL dormant state, the UE 100A may omit adjustment of a transmission timing in the uplink. When the UE 100A is in the UL dormant state, the UE 100A may omit adjustment of a transmission power in the uplink. The UE 100A in the UL dormant state can execute adjustment of a transmission timing in the sidelink. The UE 100A executes adjustment of a transmission power in the sidelink.

When the UE 100A is in the UL dormant state, the UE 100A may stop transmitting an SRS (Sounding Reference Signal).

The eNB 200-1 does not execute an RRM (Radio Resource Management) for the UE 100A that is in the UL dormant mode. For example, the eNB 200-1 may ignore the measurement report from the UE 100A. The eNB 200-1 does not have to execute control of the transmission timing in the uplink. That is, the eNB 200-1 may omit transmission of timing advance information that is used by the UE 100 in order to adjust the transmission timing in the uplink. The eNB 200-1 does not have to execute control of the transmission power in the uplink. That is, the eNB 200-1 may omit transmission of transmission power control information that is used by the UE 100 in order to adjust the transmission power in the uplink.

After that, the UE 100A may terminate the UL dormant mode. For example, the UE 100A may terminate the UL dormant mode when the second connection is released. The UE 100A may terminate the UL dormant mode when the release of the second connection is determined.

The UE 100A can terminate the UL dormant mode based on an instruction from the eNB 200-1. The eNB 200-1 can transmit an instruction for terminating the UL dormant mode to the UE 100A via the first connection or the second connection. For example, the eNB 200-1 can transmit the instruction to the UE 100A before a handover if a candidate (eNB 200-2) of the handover destination of the UE 100B (or the UE 100A) does not support the UL dormant mode.

As described above, the eNB 200-1 transmits the first message to the UE 100A when the second connection is established between the UE 100A and the UE 100B. The UE 100A receives the first message transmitted from the eNB 200-1 when the second connection is established. As a result, the UE 100A does not directly transmit the uplink information to the eNB 200-1, and thus can reduce the power consumption while receiving the downlink information without delay.

(B) Operation Pattern 2

Figure 9:
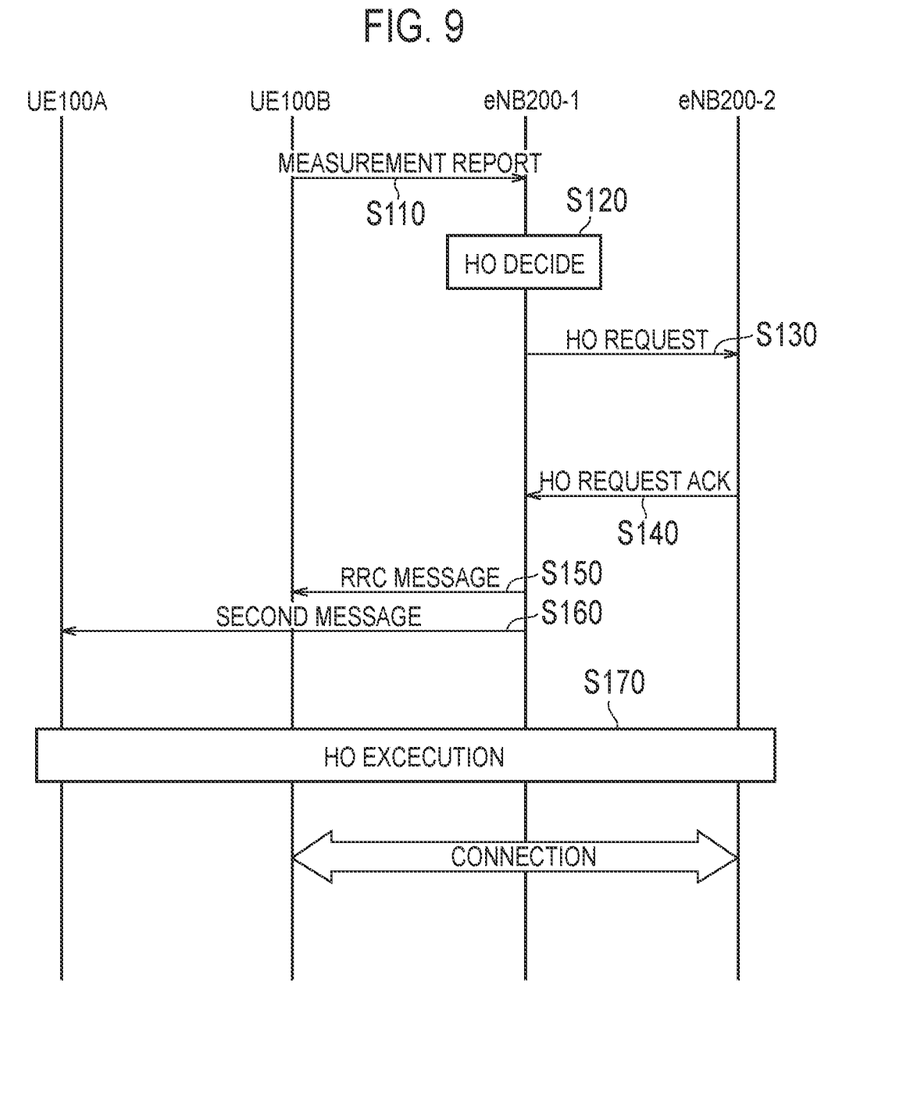
FIG. 9 is a sequence chart for describing Operation pattern 2.

Operation pattern 2 will be described with reference to FIG. 9. FIG. 9 is a sequence chart for describing Operation pattern 2.

In an initial state of FIG. 9, the UL dormant mode is applied to the UE 100A.

In step S110, the UE 100B transmits the measurement report to the eNB 200-1. The eNB 200-1 receives the measurement report from the UE 100B.

In step S120, the eNB 200-1 decides whether or not to cause the UE 100B to execute a handover based on the measurement report.

In the following description, it is assumed that the eNB 200-1 decides a handover of the UE 100B from the eNB 200-1 (first cell) to the eNB 200-2 (second cell).

In step S130, the eNB 200-1 transmits a handover request (Handover Request) message to the eNB 200-2. The handover request message is a message for requesting preparation of a resource for the handover.

When the UE 100B is a relay UE, the eNB 200-1 determines whether or not there is a remote UE in the UL dormant state under the control of the UE 100B. When there is a remote UE in the UL dormant mode, the eNB 200-1 may include, in the handover request message, an identifier (C-RNTI: Cell-Radio Network Temporary Identifier) individually assigned to the remote UE. The eNB 200-1 may include, in the handover request message, the G-RNTI assigned to the remote UE (UE 100A) that is in the UL dormant mode.

The eNB 200-2 receives the handover request message. The eNB 200-2 decides whether or not to approve the handover request. The following description will be made assuming that the eNB 200-2 has decided to approve the handover request.

In step S140, the eNB 200-2 transmits a handover request acknowledgment (HO request ACK) message to the eNB 200-1. The eNB 200-1 receives the HO request ACK message from the eNB 200-2.

The eNB 200-2 individually assigns an identifier (C-RNTI) used in its own cell to the UE 100B as a target of the handover.

When the handover request message includes a C-RNTI of the remote UE, the eNB 200-2 may individually assign the C-RNTI to the remote UE. When the handover request message includes a G-RNTI, the eNB 200-2 may assign the G-RNTI used in the own cell to the remote UE (UE 100A) that is in the dormant mode. If the eNB 200-2 assigns the G-RNTI, the eNB 200-2 does not have to individually assign a C-RNTI to the remote UE.

The HO request ACK message includes the C-RNTI assigned to the UE 100B. The HO request ACK message includes parameters (RRC parameters) set in the UE 100B in the second cell (eNB 200-2).

The HO request ACK message may include the C-RNTI assigned to the remote UE (UE 100A). The HO request ACK message includes parameters (RRC parameters) individually set in the remote UE (UE 100A) in the second cell (eNB 200-2).

The HO request ACK message may include the G-RNTI assigned to the remote UE (UE 100 A). The HO request ACK message may include parameters (RRC parameters) commonly set in the remote UE that is in the dormant mode in the second cell (eNB 200-2).

In step S150, the eNB 200-1 transmits an RRC message (RRCConnectionReconfiguration message) to the UE 100B. The RRC message is a message for the UE 100B to execute a handover from the eNB 200-1 (first cell) to the eNB 200-2 (second cell). The eNB 200-1 includes, in the RRC message, information for the UE 100B included in the HO request ACK message. Specifically, the RRC message includes the C-RNTI assigned to the UE 100B by the eNB 200-2, and the RRC parameters.

In step S160, the eNB 200-1 transmits a message (second message) to the UE 100A. The eNB 200-1 can transmit the second message to the UE 100A via the first connection or the second connection.

The second message is a message for the relay UE (UE 100B) that is in the UL dormant mode to execute a handover from the eNB 200-1 (first cell) to the eNB 200-2 (second cell).

The eNB 200-1 includes, in the second message, information for the remote UE (UE 100A) included in the HO request ACK message. For example, the second message may include a C-RNTI (new C-RNTI) assigned to the UE 100A by the eNB 200-2, and individual RRC parameters.

If a G-RNTI is assigned to the UE 100A, the second message may include the G-RNTI (new G-RNTI) assigned to the UE 100A by the eNB 200-2, and common RRC parameters. In this case, the eNB 200-1 may transmit the second message by broadcast. The second message is a message for all the remote UEs that are in the the dormant state among all the remote UEs to be relayed by the UE 100B so that the dormant-state UEs execute a handover from the eNB 200-1 (first cell) to the eNB 200-2 (second cell). Accordingly, all the remote UEs holding the G-RNTI corresponding to the G-RNTI included in the second message execute the handover.

The eNB 200-1 can transmit the second message to the UE 100A based on the measurement report from the relay UE (UE 100B). Accordingly, the eNB 200-1 can transmit the second message for handover to the UE 100A even though the eNB 200-1 has not received the measurement report from the UE 100A.

In step S170, a handover execution procedure is executed.

In response to receiving the RRC message, the UE 100B executes the handover procedure. Specifically, the UE 100B establishes synchronization with the eNB 200-2 (second cell) by receiving a synchronization signal from the eNB 200-2 (second cell). After that, the UE 100B executes a connection process for establishing a connection with the eNB 200-2 (second cell).

Specifically, when the RRC message of step S150 indicates an individual RA (Random Access) preamble, the UE 100B executes a contention-free random access procedure. That is, the UE 100B transmits the RA preamble to the eNB 200-2 to establish a connection with the eNB 200-2.

For example, in the random access procedure, the UE 100B executes adjustment of the transmission timing. The UE 100B adjusts the transmission timing based on timing advance information included in a response to the RA preamble from the eNB 200-1. The timing advance information is information used by the UE 100 to adjust the transmission timing in the uplink.

In response to receiving the second message, the UE 100A executes the handover procedure. As with the UE 100B, the UE 100A establishes downlink synchronization with the eNB 200-2 (second cell) by receiving a synchronization signal from the eNB 200-2 (second cell).

The UE 100B applies parameters (such as a new C-RNTI, and RRC parameters) included in the RRC message of step S150. Thus, a connection (RRC connection) is established between the UE 100B and the eNB 200-2.

On the other hand, the UE 100A can omit a process for establishing uplink synchronization. Accordingly, the UE 100A may omit execution of the random access procedure.

When there is uplink information to be transmitted to the eNB 200-2 via the first connection, the UE 100A may execute the process for establishing uplink synchronization. That is, the UE 100A may execute the random access procedure.

The UE 100A applies parameters (such as a new C-RNTI (or a new G-RNTI), and RRC parameters) included in the second message. Thus, the first connection (RRC connection) is established between the UE 100A and the eNB 200-2. Therefore, the UE 100A can maintain the UL dormant mode (dormant state) also in the eNB 200-2. Accordingly, the UE 100A can receive the downlink information from the eNB 200-2 via the first connection.

The UE 100A may transmit a message (RRCConnectionReconfigurationComplete message) for confirming a handover to the eNB 200-2 via the UE 100B. Alternatively, the UE 100A may omit transmission of that message to the eNB 200-2. On the other hand, the UE 100B transmits that message to the eNB 200-2. The eNB 200-2 may regard the UE 100A as having completed the handover based on the message from the UE 100B.

As described above, the process for establishing uplink synchronization can be omitted, and thus signaling between the UE 100B and the network (the eNB 200-1 and the eNB 200-2) can be reduced.

(C) Operation Pattern 3

Figure 10:
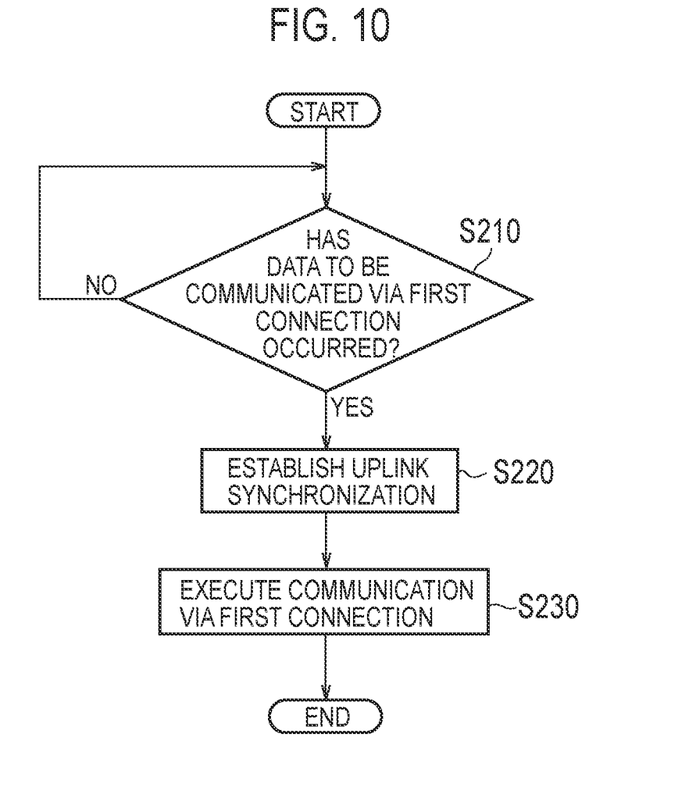
FIG. 10 is a flowchart for describing Operation pattern 3.

Operation pattern 3 will be described with reference to FIG. 10. FIG. 10 is a flowchart for describing Operation pattern 3.

In Operation pattern 3, an operation for appropriately transmitting the uplink information when the UE 100 is continuously in the UL dormant mode state even after the handover is executed will be described.

FIG. 10 illustrates a state after the UE 100A and the UE 100B have been subjected to the handover from the eNB 200-1 to the eNB 200-2. In an initial state of FIG. 10, the UE 100A is in the UL dormant state. In other words, the UE 100A has established the first connection (RRC connection) with the eNB 200-2. The UE 100A has established the second connection for relay with the UE 100B.

In step S210, the UE 100A determines whether or not there is information to be communicated via the first connection. When there is information to be communicated via the first connection (for example, when there is a voice call to the UE 100A), the UE 100A executes the process of step S220. On the other hand, when there is no information to be communicated, the UE 100A does not execute the process of step S220.

For example, when there is uplink information to be transmitted via the first connection, the UE 100A may execute the process of step S220. For example, when there is transmission data (when data is received from an upper layer), the UE 100A may execute the process of step S220. When there is downlink information to be received via the first connection, the UE 100A may execute the process of step S220. When receiving downlink data or a control signal (for example, paging message and the like) from the eNB 200-2, the UE 100A may execute the process of step S220. Accordingly, when receiving a radio signal including the identifier (C-RNTI or G-RNTI) assigned to the UE 100A from the eNB 200-1, the UE 100A may execute the process of step S220.

In step S220, the UE 100A executes the process for establishing uplink synchronization. Specifically, the UE 100A executes the random access procedure. In the random access procedure, the UE 100A may acquire (receive) timing advance information (TA value) from the eNB 200-2. The UE 100A may acquire (receive) a power control parameter from the eNB 200-2.

The UE 100A may acquire uplink control information (i.e., the timing advance information and/or the power control parameter) from the UE 100B. The UE 100A may request the UE 100B for the uplink control information via the sidelink. The UE 100B may transmit the uplink control information to the UE 100A via the sidelink in response to the request.

The UE 100A may preferentially apply the uplink control information acquired from the UE 100B over information (the timing advance information and/or the power control parameter) acquired from the eNB 200-2 in the random access procedure.

On the other hand, when the UE 100A is not assigned a C-RNTI by the eNB 200-2, the UE 100A executes a contention-based random access procedure. As a result, the UE 100A not only acquires the timing advance information (TA value) from the eNB 200-2 but also is assigned a C-RNTI by the eNB 200-2. The UE 100A may acquire the power control parameter from the eNB 200-2.

When the UE 100A is assigned a G-RNTI instead of the C-RNTI, the UE 100A may include the G-RNTI in a message (Msg 3) in the random access procedure. The eNB 200-2 can grasp, based on the notified G-RNTI, that the UE 100A that is a source of the connection request is under the control of the UE 100B that is the relay UE.

When the UE 100A is not assigned a C-RNTI by the eNB 200-2, the UE 100A may request the eNB 200-2 for the C-RNTI via the second connection. The UE 100A may include a UE ID of the NAS level as its identifier in the request.

In response to a request from the UE 100A, the UE 100B transmits a message to the eNB 200-2 to request the eNB 200-2 to assign a C-RNTI to the UE 100A. The UE 100B can include, in the message, an identifier of the UE (UE 100A) that needs the C-RNTI. The identifier of the UE may include an identifier of the UE (UE ID of the NAS level) included in the request from the UE 100A.

The eNB 200-2 assigns a C-RNTI to the UE 100A in response to receiving the message from the UE 100B. The eNB 200-2 can notify the assigned C-RNTI via the UE 100B. The eNB 200-2 may notify the UE 100A of the C-RNTI via the first connection.

The UE 100B notifies the UE 100A of the C-RNTI received from the eNB 200-2. The UE 100B may notify the UE 100A of the uplink control information (i.e., the timing advance information and/or the power control parameter) set in the UE 100B itself as well as the C-RNTI.

In step S230, the UE 100A establishes uplink synchronization based on the timing advance information. Accordingly, the UE 100A can transmit an appropriate uplink signal. The UE 100A can transmit the uplink signal at a transmission power based on the power control parameter.

Other Embodiments

The contents of the present application are described according to each of the above-described embodiments, but it should not be understood that the discussion and the drawings constituting a part of this disclosure limit the contents of the present application. From this disclosure, various alternative embodiments, examples, and operational technologies will become apparent to those skilled in the art.

In Operation pattern 3 described above, the UE 100A executes the process for establishing uplink synchronization with the eNB 200-2, but the operation of the UE 100A is not limited thereto. Without executing that process, the UE 100A may directly transmit uplink information (control information, user data, and the like) to the eNB 200-2.

Specifically, the UE 100A can transmit the uplink information to the eNB 200-2 based on resource setting information for transmission in the UL dormant state. The resource setting information indicates an area for transmission in the UL dormant state. The area indicates a control area for transmitting the control information and/or a data area for transmitting the user data. The UE 100A can transmit the uplink information to the eNB 200-2 by using a radio resource in the area.

The eNB 200-2 can transmit the resource setting information by broadcast (for example, an SIB). After the handover, the UE 100A receives the resource setting information from the eNB 200-2 (cell) via the first connection. The area indicated by the resource setting information may be a common area (CB (Contention Based)-PUSCH area) commonly used among other UEs that are in the UL dormant state. In the other UEs, the UE 100B may be under the control of the relay UE. In this case, the resource setting information can include a G-RNTI (or C-RNTI) associated with the common area. When the UE 100 transmits the uplink information to the eNB 200-1 by using the CB-PUSCH area, the UE 100 does not have to use the final symbol of the PUSCH area. This makes it possible to prevent collision of the uplink information due to no establishment of uplink synchronization between the UE 100A and the eNB 200-2.

The eNB 200-2 may transmit the resource setting information via the first connection by unicast. The area indicated by the resource setting information may be an individual area allocated to the UE 100A. The area indicated by the resource setting information may be a common area. The UE 100A may request the eNB 200-2 (cell) for the resource setting information to via the UE 100B. In response to that request, the eNB 200-2 may transmit the resource setting information via the first connection.

The eNB 200-2 may notify the UE 100A of the resource setting information at the time of handover. Specifically, the eNB 200-2 may transmit the HO request ACK message including the resource setting information to the eNB 200-1 (see step S140 in FIG. 9). The eNB 200-1 can transmit the second message including the resource setting information to the UE 100A (see step S160 in FIG. 9). The UE 100B may transmit the uplink information to the eNB 200-2 based on the resource setting information included in the second message. Thus, the eNB 200-2 can increase the success rate of reception of the uplink information even when the UE 100A has not established uplink synchronization with the eNB 200-2. Since the UE 100A holds the resource setting information in advance, the UE 100A can promptly transmit the uplink information.

The above description is for the case where the eNB 200-2 transmits the resource setting information. However, the eNB 200-1 may also transmit the resource setting information. The UE 100A in the UL dormant state may transmit the uplink information to the eNB 200-2 based on the resource setting information before the handover is executed. Thus, even when the UE 100A omits adjustment of the transmission timing in the uplink, the eNB 200-1 can increase the success rate of reception of the uplink information.

The operation according to the above-described embodiments may be combined to be executed, where appropriate. In each of the above-described sequences, all of the operations may not necessarily be an essential configuration. For example, in each sequence, only some of the operations may be executed.

Although not particularly mentioned in each of the above-described embodiments, a program for causing a computer to execute each process performed by any one of the above-described nodes (such as the UE 100 and the eNB 200) may be provided. The program may be recorded on a computer-readable medium. If the computer-readable medium is used, it is possible to install the program in a computer. Here, the computer-readable medium recording therein the program may be a non-transitory recording medium. The non-transitory recording medium may include, but not be limited to, a recording medium such as a CD-ROM and a DVD-ROM, for example.

Alternatively, a chip may be provided which includes: a memory for storing a program for performing each process performed by any one of the UE 100 and the eNB 200; and a processor) for executing the program stored in the memory.

In the above-described embodiments, an LTE system is described as an example of the mobile communication system; however, the LTE system is not an exclusive example, and the content according to the present application may be applied to a system other than the LTE system.

The invention claimed is:

1. A radio terminal, comprising:
a controller configured to
establish a direct first connection between the radio terminal and a base station, and
establish a second connection between a relay terminal connected to the base station and the radio terminal, the second connection being a connection for relay; and
a receiver configured to receive a first message from the base station in response to the second connection being established, wherein
the first message is a message for restricting the radio terminal from transmitting uplink information to the base station via the first connection, the receiver is configured to receive a second message from the base station for executing a handover from the base station to another base station, the second message being transmitted by the base station based on a measurement report on a radio environment of the relay terminal, in response to receiving the first message, the controller is configured to determine to omit a process of transmitting a measurement report on a radio environment of the radio terminal to the base station, and in response to receiving the second message, the controller is configured to execute the handover according to the second message, and omit a process for establishing uplink synchronization with the another base station when executing the handover.

2. The radio terminal according to claim 1, wherein the first message includes a first identifier that is commonly assigned to all radio terminals that are relayed by the relay terminal and have received the first message, and the second message is a message for all the radio terminals to execute a handover from the base station to the other base station.

3. The radio terminal according to claim 1, wherein the first message includes a first identifier that is commonly assigned to all radio terminals that are relayed by the relay terminal and have received the first message, and the second message is a message for all the radio terminals to execute a handover from the base station to the other base station.

4. The radio terminal according to claim 3, wherein the second message does not include an identifier individually assigned by the other base station, and the controller executes a contention-based random access procedure when there is information to be communicated via a direct connection with the other base station.

5. The radio terminal according to claim 4, wherein the second message includes a second identifier commonly assigned to all the radio terminals instead of an identifier individually assigned by the other base station, and the controller notifies the base station of the second identifier in the random access procedure.

6. A radio terminal, comprising:

a controller configured to establish a direct first connection between the radio terminal and a base station, and establish a second connection between a relay terminal connected to the base station and the radio terminal, the second connection being a connection for relay; and a receiver configured to receive a first message from the base station in response to the second connection being established, wherein the first message is a message for restricting the radio terminal from transmitting uplink information to the base station via the first connection, and in response to receiving the first message, the controller is configured to determine to omit a process of transmitting a measurement report on a radio environment of the radio terminal to the base station.

* * * * *